(12) United States Patent
Whitney et al.

(10) Patent No.: US 8,657,721 B2
(45) Date of Patent: Feb. 25, 2014

(54) DRIVELINE STIFFNESS RELAXATION SYSTEMS AND METHODS FOR DFCO OPERATION

(75) Inventors: Christopher E. Whitney, Commerce, MI (US); Jeremy V. Horgan, Northville, MI (US); Scott A. Hearld, Waterford, MI (US); Lars Mikael Buur, Brighton, MI (US); Ryan Goode, Howell, MI (US); Krishnendu Kar, South Lyon, MI (US)

(73) Assignee: GM Global Technology Operations LLC

( * ) Notice: Subject to any disclaimer, the term of this patent is extended or adjusted under 35 U.S.C. 154(b) by 368 days.

(21) Appl. No.: 13/101,494

(22) Filed: May 5, 2011

(65) Prior Publication Data

US 2012/0234123 A1  Sep. 20, 2012

Related U.S. Application Data

(60) Provisional application No. 61/452,851, filed on Mar. 15, 2011.

(51) Int. Cl.
*B60W 10/02* (2006.01)
*B60W 10/04* (2006.01)

(52) U.S. Cl.
USPC ............................................. 477/176; 477/84

(58) Field of Classification Search
USPC ......... 477/54, 70, 83, 84, 101, 118, 121, 166, 477/173–176; 701/67
See application file for complete search history.

(56) References Cited

U.S. PATENT DOCUMENTS

| | | | | |
|---|---|---|---|---|
| 5,547,438 | A | * | 8/1996 | Nozaki et al. ................. 477/169 |
| 5,562,571 | A | * | 10/1996 | Maruyama et al. ........... 477/174 |
| 5,807,209 | A | * | 9/1998 | Matsubara et al. ........... 477/176 |
| 5,879,266 | A | * | 3/1999 | Sawamura et al. ............. 477/62 |
| 5,935,043 | A | * | 8/1999 | Watanabe et al. ............. 477/169 |
| 2003/0060330 | A1 | * | 3/2003 | Sato et al. ..................... 477/174 |
| 2009/0149298 | A1 | * | 6/2009 | Otanez et al. ................. 477/176 |

* cited by examiner

*Primary Examiner* — Justin Holmes

(57) ABSTRACT

A powertrain system includes an engine control module that generates a negative torque transition signal based on a pending negative torque event of an engine. A transmission control module receives the negative torque transition signal from the engine control module. The transmission control module increases a slip speed of a torque converter clutch in preparation for the pending negative torque event by adjusting pressure in the torque converter clutch prior to the pending negative torque event. The transmission control module decreases the slip speed in the torque converter clutch based on completion of a transition at least one of to the pending negative torque event and from the pending negative torque event.

19 Claims, 6 Drawing Sheets

DRIVELINE STIFFNESS RELAXATION SYSTEMS AND METHODS FOR DFCO OPERATION

CROSS-REFERENCE TO RELATED APPLICATIONS

This application claims the benefit of U.S. Provisional Application No. 61/452,851, filed on Mar. 15, 2011. The disclosure of the above application is incorporated herein by reference in its entirety.

FIELD

The present disclosure relates to internal combustion engines and more particularly to fuel cutoff systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Deceleration fuel cut off (DFCO) systems are used in powertrains to disable fuel to an internal combustion engine (ICE). DFCO is typically enabled while a driveline (e.g., transmission, driveshaft, axle, and wheels) is engaged to the ICE. This supports and prevents stalling of the ICE due to deceleration of a vehicle and contact between the wheels of the vehicle and a road surface.

DFCO is used for various reasons. DFCO may be used to provide deceleration (powertrain braking) force when an accelerator of a vehicle is not actuated (e.g., vehicle operator does not press on accelerator pedal). In high elevation (mountainous) areas and/or areas with large variations in elevation, DFCO is used to provide powertrain braking to avoid damage to friction brakes of a vehicle. Although fuel is disabled when DFCO is enabled, the ICE may continue to draw air into the cylinders of the ICE. The drawing of air into the cylinders, compression of the air, and expulsion of the air from the ICE applies a braking (i.e., negative) torque on the ICE and/or powertrain. As such, torque losses attributable to engine pumping (i.e., pumping losses) occur when DFCO is enabled.

DFCO may also be used to prevent damage to a catalytic converter. For example, a throttle position may be calibrated and fixed to provide a minimal amount of air per cylinder (APC) to an engine, thereby providing vehicle deceleration when traveling downhill. Due to the fixed throttle position and/or a manual pull down of a transmission (PRNDL) shifter (e.g., shift into a low gear, such as L1 or L2), the APC levels of the ICE can become too low and cause a misfire. A misfire refers to incomplete combustion of an air/fuel mixture in a cylinder of the engine. This misfire can result in fuel entering and igniting in an exhaust system, which increases temperature of a catalyst of the catalytic converter. Damage to the catalyst can occur when temperatures of the catalyst exceed a threshold. By using DFCO, fuel is disabled, which protects the catalyst from misfire events.

DFCO may also be used to increase fuel economy. The efficiency of a gasoline spark ignited engine can be low at minimum combustion (i.e. minimum air and fuel levels) because of the pumping losses and other factors. Disabling the fuel is more efficient than reducing the amount of fuel to an ICE.

SUMMARY

A powertrain system is provided and includes an engine control module that generates a negative torque transition signal based on a pending negative torque event of an engine. A transmission control module receives the negative torque transition signal from the engine control module. The transmission control module increases a slip speed of a torque converter clutch in preparation for the pending negative torque event by adjusting pressure in the torque converter clutch prior to the pending negative torque event. The transmission control module decreases the slip speed in the torque converter clutch based on completion of a transition of at least one of to the pending negative torque event and from the pending negative torque event.

In other features, a method of operating a powertrain system is provided. The method includes generating a negative torque transition signal based on a pending negative torque event of an engine via an engine control module. The negative torque transition signal is received from the engine control module via a transmission control module. A slip speed of a torque converter clutch is increased in preparation for the pending negative torque event. The increase in the slip includes adjusting pressure in the torque converter clutch prior to the pending negative torque event. The slip speed is decreased in the torque converter clutch based on completion of a transition to the pending negative torque event or from the pending negative torque event.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
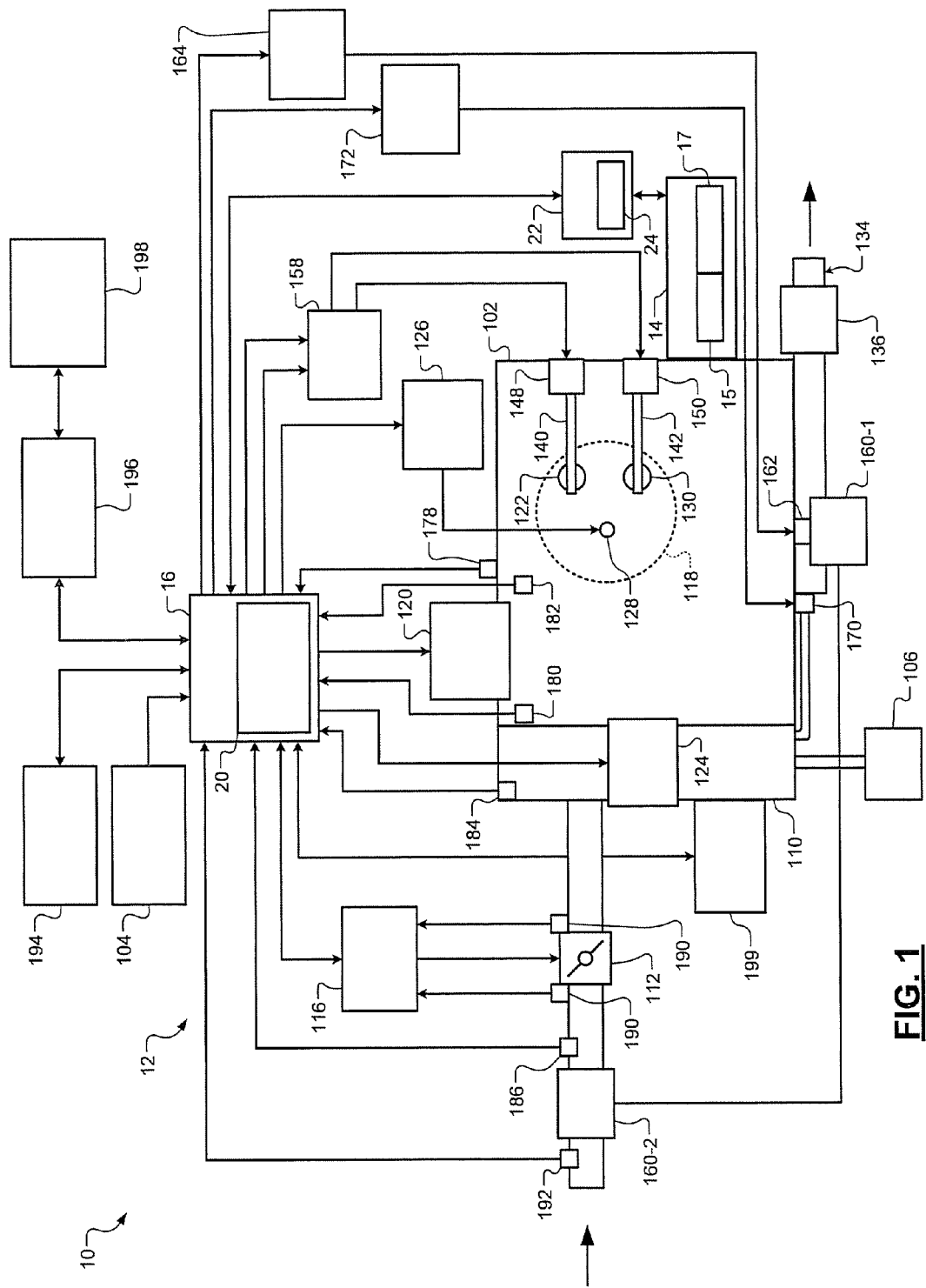
FIG. 1 is a functional block diagram of a powertrain system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A powertrain may include an internal combustion engine (ICE), a torque converter clutch (TCC) and a transmission. The TCC may be locked up and/or the slip of the TCC may be controlled during a negative torque event of the ICE, such as when deceleration fuel cut off (DFCO) is enabled. A negative torque event may refer to when an ICE is producing negative torque, which provides braking force on a powertrain. A TCC may be locked up, for example, when the TCC is not experiencing slip or a minimum level of slip. A TCC may be locked up, for example, when difference in input and output speeds of the TCC are equal, an impeller speed of the TCC is equal to a turbine speed, and/or a crankshaft speed of the ICE is equal to a turbine speed of the TCC. The TCC may be locked up and/or the amount of slip of the TCC may be controlled to avoid an engine stall. An engine stall may refer to, for example, when speed of the ICE is abruptly reduced to 0.

A powertrain control system of a vehicle may include an engine control module (ECM) and a transmission control module. The ECM controls operation of an ICE while the TCM controls operation of a transmission system, which may include a TCC. A transition to a negative torque event (e.g., a DFCO event) is performed quickly (e.g., in less than 1 second) to minimize the time that the engine is in an unbalanced state (firing on partial cylinders) and to minimize emissions. The transition may be from a fuel active state to a fuel inactive state. During a negative torque event and while the vehicle is moving, the ICE is prevented from stalling and/or the speed of the ICE is maintained above a predetermined speed (e.g., 500-700 revolutions per minute (RPM)).

The speed of the ICE is maintained above the predetermined speed by maintaining the TCC in a locked state and/or by maintaining a slip speed of the TCC at less than a predetermined speed (e.g., less than 50 RPM). The slip speed may refer to a difference in input and output speeds of the TCC. This allows DFCO to be disabled and the ICE to provide positive output torque quickly when an increase in output torque is requested (e.g. a "tip-in" event occurs). A "tip-in" event refers to an increase in torque requested due to actuation in an accelerator (e.g., depressing of an accelerator pedal). If the engine were not maintained above a predetermined speed, the engine may need to be started from a stop (deactivated state), which would require additional time to respond to a driver "tip-in" event.

The TCM may not have information regarding when a negative torque event is to occur. The TCM may attempt to estimate when a negative toque event is to occur based on output speed or torque estimation of the ICE from the ECM. Prior to the negative torque event, the TCM may estimate the output torque of the engine to be 0 Newton-meters (Nm) resulting in the TCM scheduling low TCC pressures. Because of the quick transition to a negative torque event, the estimations performed by the TCM, and the low initial TCC pressures, the TCM may not react quick enough to prevent a "slip away" event. A slip away event occurs when pressures in the TCC are not high enough to handle a large and quick transition in torque of the ICE (e.g., transition from 0 Nm to a negative level associated with the negative torque event). For these reasons, the TCC experiences more than a predetermined amount of slip, which allows the speed of the ICE to decrease (sag) to less than a turbine speed and/or a predetermined minimum speed. As a result, the TCC cannot predict and/or detect a negative torque event and ramp up fluid pressure in the TCC quick enough to prevent a slip away event. As fluid pressure in the TCC increases, the amount of slip decreases. Ramp up time of TCC fluid pressures can be approximately 200 milliseconds (ms). For the above reasons, control of slip in a TCC can be temporarily lost during a negative torque event.

To prevent a slip away event, an ECM may gradually transition into a DFCO enabled state and/or delay the transition to provide enough time for a TCM to adjust pressures in a TCC accordingly. This may include the ECM ramping engine output torque from approximately 0 Nm to a negative torque level. The ramping of the engine output torque allows the TCM to detect the change in output torque and increase pressures in the TCC to maintain speed of the ICE. Although this can prevent the ICE from stalling, fuel economy is negatively affected. As an alternative, a locked torque converter may be used, but this degrades the drivability as a vehicle operator can experience and/or feel a transition into a DFCO event.

In addition, when transitioning from a negative torque event to a positive torque event (e.g., exiting a DFCO event), a TCC crash (i.e. a lock up of the TCC) can occur. Prior to exiting the negative torque event, a TCM may have scheduled enough clutch pressure in the TCC to support the negative torque of the ICE for the negative torque event and prevent a slip away event. Then the ICE disables DFCO and enables combustion (fuel and spark) of the ICE to exit the negative torque event. The torque of the engine quickly increases from a large negative torque to a value that will be less negative and can be close to 0 Nm. This results in a crash of the TCC, as there is too much pressure in the TCC for the increased torque level (or decrease in magnitude of the negative engine output torque). The crash may be felt by the vehicle operator as the driveline is now locked to the engine and the dampening effect of the torque converter is lost.

Enabling and disabling other negative torque operations can also result in slip away and crash events. For example, during a DFCO event air-conditioning (or other load introducing device or accessory) may be enabled and disabled. Additional load is introduced on an ICE when an air-conditioning clutch is engaged. This increase in load can be compensated for when DFCO is disabled (fuel is enabled) by preparing a torque reserve (i.e. increased airflow with retarded spark). The torque reserve is prepared prior to the air-conditioning clutch be engaged. On a gasoline spark ignited engine, spark is advanced when the air-conditioning clutch engages based on a torque command to increase torque output of the engage and compensate for the increased load on the engine. This torque reserve cannot be provided when DFCO is enabled. For this reason, the ICE cannot compensate for changing accessory load when DFCO is enabled. As a result, a slip away event can occur and speed of the ICE can decrease when the air-conditioning clutch (or other load introducing device or accessory) is engaged during a DFCO event.

A fixed displacement cycling clutch (FDCC) compressor is generally less expensive than a variable displacement compressor. However, probability of a slip away event occurring during a DFCO event is increased when a FDCC compressor is used. Unlike a variable displacement compressor which gradually increases load on an ICE, a FDCC compressor applies a jump in the amount of load on an ICE which cannot be ramped on. The fixed displacement compressor has a fixed displacement, which has a corresponding torque load that ramps up as the pressure on the outlet port (high pressure side of the pump) increases. Pressure within the FDCC compressor increases while activated. The FDCC compressor is deactivated when pressure increases to a first threshold. The FDCC compressor is reactivated when the pressure decreases to a second threshold. Consequently, the FDCC compressor cycles between ON and OFF states by engaging and disengaging the air-conditioning clutch.

As a result, during the ON states, a FDCC compressor iteratively introduces a step in the amount of torque load from the accessory drive on the engine and is less efficient than a variable displacement compressor. A slip away event may occur during each of the ON states. The more slip away events experienced during DFCO, the more drivability is degraded.

The above-stated issues cause inconsistent negative torque event transitions and can negatively affect fuel economy because DFCO may be exit prematurely due to low engine speed. The above-stated issues are resolved by the implementations disclosed below. The implementations aid in isolating axle torque from jerks or sudden accelerations experienced during the negative torque event transitions.

Referring now to FIG. 1, a functional block diagram of a powertrain system 10 is presented. The powertrain system 10 includes an engine system 12 and a transmission system 14 with a torque converter clutch 15. The engine system 12 includes an engine control module (ECM) 16 with a fuel cutoff control module 20. The transmission system 14 includes a transmission control module (TCM) 22 with a slip control module 24. The transmission system 14 may include, for example, an automatic transmission, a semi-automatic transmission, a dual clutch transmission, etc. (hereinafter transmission 17). The fuel cutoff control module 20 and the slip control module 24 communicate with each other and operate to prevent slip away events and crash events. The slip away events may be prevented, for example, when transitioning to a negative torque event. The crash events may be prevented, for example, when transitioning from a negative torque event. The transitions are performed while minimizing or dampening sudden jerks or accelerations generated. Operation of the fuel cutoff control module 20 and the slip control module 24 are further described below with respect to FIGS. 3A-5.

The powertrain system 10 includes an engine 102 that combusts an air/fuel mixture to produce drive torque for a vehicle based on driver input from a driver input module 104. Air is drawn into an intake manifold 110 through a throttle valve 112. The ECM 16 controls a throttle actuator module 116, which regulates opening of the throttle valve 112 to control the amount of air drawn into the intake manifold 110. A brake booster 106 draws vacuum from the intake manifold 110 when the pressure within the intake manifold 110 is less (i.e., is a greater vacuum) than a pressure within the brake booster 106. The brake booster 106 assists a vehicle user in applying brakes of the vehicle.

Air from the intake manifold 110 is drawn into cylinders (one is shown) of the engine 102. The ECM 16 may instruct a cylinder actuator module 120 to selectively deactivate some of the cylinders, which may improve fuel economy under certain engine operating conditions. The engine 102 may operate using a four-stroke cylinder cycle. The four strokes, described below, are named the intake stroke, the compression stroke, the combustion stroke, and the exhaust stroke. During each revolution of a crankshaft (not shown), two of the four strokes occur within the cylinder 118.

During the intake stroke, air from the intake manifold 110 is drawn into the cylinder 118 through an intake valve 122. The ECM 16 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 16, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

During the combustion stroke, the combustion of the air/fuel mixture drives the piston down, thereby driving the crankshaft. During the exhaust stroke, the piston begins moving up from bottom dead center (BDC) and expels the byproducts of combustion through an exhaust valve 130. The byproducts of combustion are exhausted from the vehicle via an exhaust system 134. A catalyst 136 receives exhaust gas output by the engine 102 and reacts with various components of the exhaust gas. For example only, the catalyst may include a three-way catalyst (TWC), a catalytic converter, or another suitable exhaust catalyst.

The intake valve 122 may be controlled by an intake camshaft 140, while the exhaust valve 130 may be controlled by an exhaust camshaft 142. The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The times at which the intake and exhaust valves 122, 130 are opened may be varied with respect to piston TDC by intake and exhaust cam phasers 148, 150. A phaser actuator module 158 may control the intake and exhaust cam phasers 148, 150 based on signals from the ECM 16.

The powertrain system 10 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 16 may control the turbocharger via a boost actuator module 164. The boost actuator module 164 may modulate the boost of the turbocharger by controlling the position of the wastegate 162.

The powertrain system 10 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The powertrain system 10 may measure the speed of the crankshaft (i.e., engine speed) in revolutions per minute (RPM) using an RPM sensor 178. Temperature of engine oil may be measured using an oil temperature (OT) sensor 180. Temperature of engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. The mass flow rate of air flowing into the intake manifold 110 may be measured using a mass air flowrate (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 16 may use signals from one or more of the sensors to make control decisions for the powertrain system 10.

The ECM 16 may communicate with a transmission control module 194 to coordinate shifting gears (and more specifically gear ratio) in a transmission (not shown). For example, the ECM 16 may reduce engine torque during a gear shift. The ECM 16 may communicate with a hybrid control module 196 to coordinate operation (i.e., torque output production) of the engine 102 and an electric motor 198.

The electric motor 198 may also function as a generator, and may be used to produce electrical energy for use by vehicle electrical systems and/or for storage in an energy storage device (e.g., a battery). The production of electrical energy may be referred to as regenerative braking. The electric motor 198 may apply a braking (i.e., negative) torque on the engine 102 to perform regenerative braking and produce electrical energy. The powertrain system 10 may also include one or more additional electric motors. In various implementations, various functions of the ECM 16, the transmission control module 194, and the hybrid control module 196 may be integrated into one or more modules.

Each system that varies an engine parameter may be referred to as an engine actuator. Each engine actuator receives an associated actuator value. For example, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

Similarly, the spark actuator module 126 may be referred to as an engine actuator, while the associated actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these engine actuators, the associated actuator values may include to number of activated cylinders, fueling rate, intake and exhaust cam phaser angles, boost pressure, and EGR valve opening area, respectively. The ECM 16 may control actuator values in order to cause the engine 102 to generate a desired engine output torque.

The powertrain system 10 may further include one or more devices and/or accessories 199 that engage with and/or provide a load on the engine 102. The devices and/or accessories may include an air-conditioning system, compressor and/or clutch, an alternator, a generator, a cooling fan, etc. The ECM 16 may control operation of the device and/or accessories 199 and may signal the slip control module 24 when one or more of these devices and/or accessories 199 are engaged, disengaged, activated and deactivated. The slip control module 24 may then adjust pressures in the TCC 15 to dampen transitioning between engaged and disengaged states and between activated and deactivated states of the devices and/or accessories 199.

Figure 2:
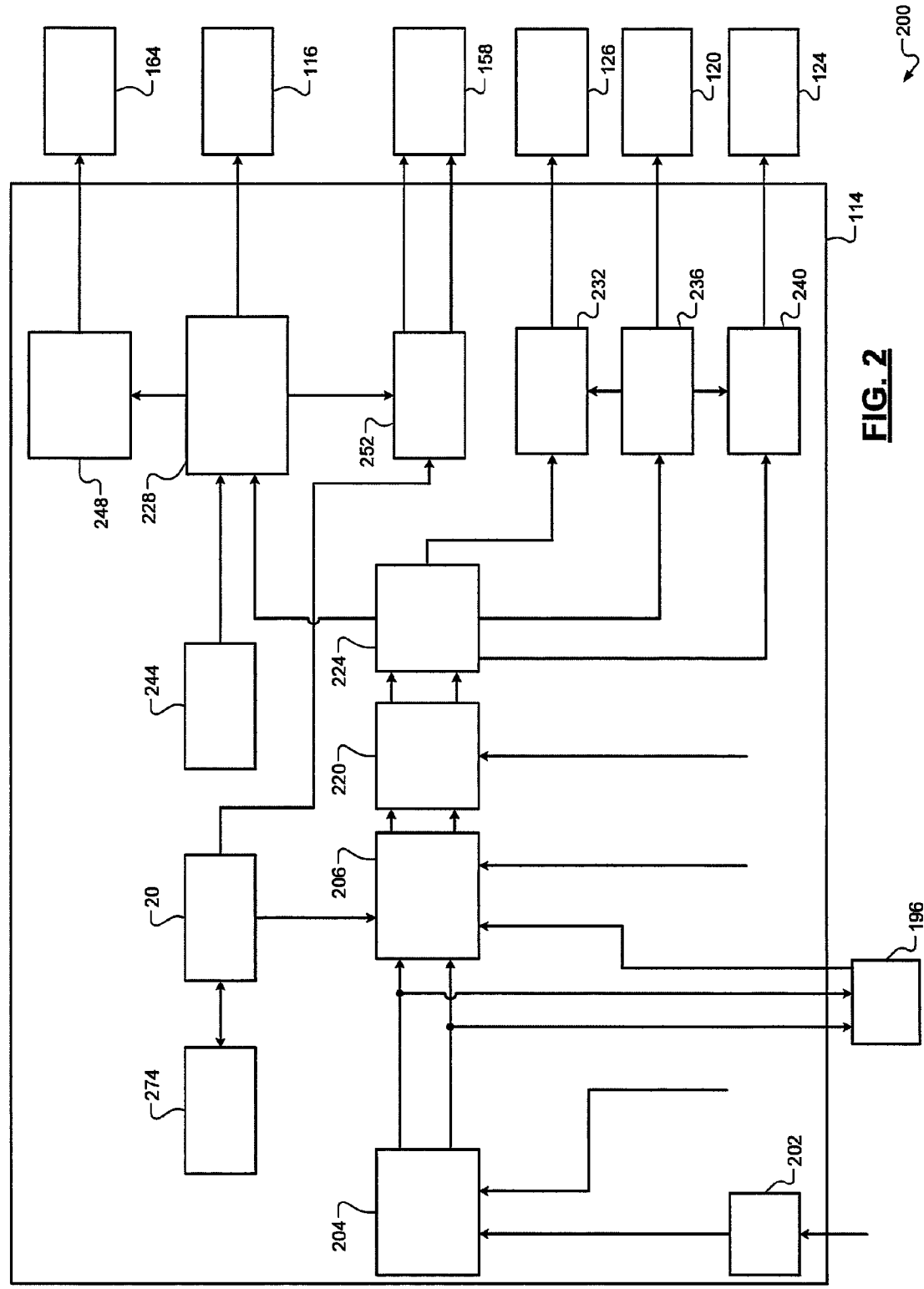
FIG. 2 is a functional block diagram of a control system in accordance with the principles of the present disclosure.

Referring now to FIG. 2, a functional block diagram of a control system 200 is presented. An implementation of the ECM 16 includes a driver torque module 202 that determines a driver torque request based on driver input(s) from the driver input module 104. The driver input may be based on a position of an accelerator pedal and/or based on a cruise control input.

An axle torque arbitration module 204 arbitrates between the driver torque request from the driver torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases. Each torque request may include data indicating the system or module that generated that torque request (i.e., the requestor).

Axle torque requests may include a torque reduction requested by a traction control system when positive wheel slip is detected. Positive wheel slip occurs when axle torque overcomes friction between the wheels and the road surface, and the wheels begin to slip against the road surface in a forward direction. Axle torque requests may also include a torque increase request to counteract negative wheel slip, where a tire of the vehicle slips in a reverse direction with respect to the road surface because the axle torque is negative.

Axle torque requests may also include brake management requests and vehicle over-speed torque requests. Brake management requests may reduce the engine output torque to ensure that the engine output torque does not exceed the ability of the brakes to hold the vehicle when the vehicle is stopped. Vehicle over-speed torque requests may reduce the engine output torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules before being used to control actuators of the engine 102.

In general terms, the immediate torque request is the amount of currently desired engine output torque, while the predicted torque request is the amount of engine output torque that may be needed on short notice. The ECM 16 therefore controls the engine 102 to produce an engine output torque equal to the immediate torque request. However, different combinations of actuator values may result in the same engine output torque. The ECM 16 may therefore control the actuator values to allow a faster transition to the predicted torque request, while still maintaining the engine output torque at the immediate torque request.

In various implementations, the predicted torque request may be based on the driver torque request. The immediate torque request may be less than the predicted torque request, such as when the driver torque request is causing positive wheel slip on an icy surface. In such a case, a traction control system (not shown) may request a reduction via the immediate torque request, and the ECM 16 reduces the torque produced by the engine 102 to the immediate torque request. However, the ECM 16 controls the engine actuators so that the engine 102 can quickly resume producing the predicted torque request once the positive wheel slip stops.

In general terms, the difference between the immediate torque request and the predicted torque request can be referred to as a torque reserve. The torque reserve represents the amount of torque more than the immediate torque request that the engine 102 can begin to produce with minimal delay. Fast engine actuators are used to increase or decrease the engine output torque. As described in more detail below, fast engine actuators are defined based on their ability to produce a response in the engine output torque relative to slow engine actuators.

In various implementations, fast engine actuators are capable of varying engine output torque within a range, where the range is established by the slow engine actuators. In such implementations, the upper limit of the range is the predicted torque request, while the lower limit of the range is limited by the torque capacity of the fast engine actuators.

In general terms, fast engine actuators can change the engine output torque more quickly than slow engine actuators can. Slow engine actuators may respond more slowly to changes in their respective actuator values than fast engine actuators do. For example, a slow engine actuator may include mechanical components that require time to move from one position to another in response to a change in the associated actuator value.

A slow engine actuator may also be characterized by the amount of time it takes for the engine output torque to begin to change once the slow engine actuator begins to implement the changed actuator value. Generally, this amount of time will be longer for slow engine actuators than for fast engine actuators. In addition, even after the engine output torque begins to change, the engine output torque may take longer to reach an engine output torque that is expected to result from the changed actuator value.

For example only, the ECM 16 may set actuator values for slow engine actuators to values that would enable the engine 102 to produce the predicted torque request if the fast engine actuators were set to appropriate values. Meanwhile, the ECM 16 may set actuator values for fast engine actuators to values that, given the slow actuator values, cause the engine 102 to produce the immediate torque request instead of the predicted torque request.

The fast actuator values therefore cause the engine 102 to produce the immediate torque request. When the ECM 16 decides to transition the engine output torque from the immediate torque request to the predicted torque request, the ECM 16 changes the actuator values associated with one or more fast engine actuators to values that correspond to the predicted torque request. Because the actuator values associated with the slow engine actuators have already been set based on the predicted torque request, the engine 102 is able to produce the predicted torque request after only the delay attributable to the fast engine actuators. In other words, the longer delay that would otherwise result from changing engine output torque using slow engine actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request.

The resulting torque reserve can be used to offset sudden increases in required engine output torque. For example only, sudden loads from an air conditioner or a power steering pump may be offset by increasing the immediate torque request. If the increase in immediate torque request is less than the torque reserve, the increase can be quickly produced by using fast engine actuators. The predicted torque request may then also be increased to re-establish the previous torque reserve.

As another example, a torque reserve may be used to reduce fluctuations in slow actuator values. Because of their relatively slow speed, varying slow actuator values may produce control instability. In addition, slow engine actuators may include mechanical parts, which may draw more power and/or wear more quickly when moved frequently.

Creating a sufficient torque reserve allows changes in desired torque to be made by varying fast engine actuators via the immediate torque request while maintaining the values of the slow engine actuators. For example only, to maintain a given idle speed, the immediate torque request may vary within a range. If the predicted torque request is set to a level above this range, variations in the immediate torque request that maintain the idle speed can be made using fast engine actuators without the need to adjust slow engine actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change spark timing for the following firing event. When the spark timing (also called spark advance) for a firing event is set to a calibrated value, a maximum torque is produced in the combustion stroke immediately following the firing event.

However, a spark advance deviating from the calibrated value may reduce the amount of torque produced in the combustion stroke. Therefore, the spark actuator module 126 may be able to vary engine output torque as soon as the next firing event occurs by varying the spark timing. For example only, a table of spark timings corresponding to different engine operating conditions may be determined during a calibration phase of vehicle design, and the calibrated value is selected from the table based on current engine operating conditions.

By contrast, changes in throttle opening area take longer to affect the engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, airflow changes based on the throttle valve opening are subject to air transport delays in the intake manifold 110. Further, increased airflow into the intake manifold 110 is not realized as an increase in engine output torque until the cylinder 118 receives additional air in the next intake stroke, compresses the additional air, and commences the combustion stroke.

Using the throttle opening area and the spark timing in an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough airflow for the engine 102 to produce the predicted torque request, the spark timing is retarded (which reduces the engine output torque) based on the immediate torque request. The engine output torque will therefore be equal to the immediate torque request.

When additional torque is needed, such as when the air-conditioning compressor is engaged, or when traction control determines that wheel slip has ended, the spark timing can be set based on the predicted torque request. By the following firing event, the spark actuator module 126 may return the spark timing to a calibrated value, which allows the engine 102 to produce the maximum engine output torque. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. Depending on the type of hybrid vehicle, the axle torque arbitration module 204 may output the predicted and immediate torque requests to the hybrid control module 196.

The predicted and immediate torque requests received by the propulsion torque arbitration module 206 are converted from an axle torque domain (torque at the wheels) into a propulsion torque domain (torque at the crankshaft). In some implementations, the predicted and immediate torque requests may be converted into the propulsion torque domain before being provided to the propulsion torque arbitration module 206. In some implementations, the predicted and immediate torque requests in the propulsion torque domain may be provided to the hybrid control module 196. The hybrid control module 196 may control the electric motor 198 based on one or more of the torque requests and may provide modified predicted and immediate torque requests to the propulsion torque arbitration module 206.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request based on the arbitration. The arbitrated torque requests may be generated by selecting a winning request from among received requests. Alternatively or additionally, the arbitrated torque requests may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. The other propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other requestors may be informed that they have lost arbitration.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

The actuation module 224 receives the predicted and immediate torque requests from the reserves/loads module 220. The actuation module 224 determines how the predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow engine actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast engine actuator. However, spark timing may not provide as much range of torque control. In addition, the amount of torque control possible with changes in spark timing (referred to as spark reserve capacity) may vary as one or more airflow conditions change.

In various implementations, the actuation module 224 may generate an air torque request based on the predicted torque request. The air torque request may be equal to the predicted torque request, thereby controlling engine airflow actuators so that the adjusted predicted torque request can be rapidly achieved by adjusting one or more actuator values associated with fast engine actuators.

An air control module 228 may determine desired actuator values for the engine airflow actuators based on the air torque request. For example, the air control module 228 may determine a desired manifold absolute pressure (MAP), a desired throttle area, and/or a desired air per cylinder (APC). The desired MAP may be used to determine desired boost, and the desired APC may be used to determine desired cam phaser positions. In various implementations, the air control module 228 may also determine a desired opening of the EGR valve 170 and other engine airflow parameters.

The actuation module 224 may also generate a spark torque request, a cylinder shut-off torque request, and a fuel mass torque request. For example only, the actuation module 224 may generate the spark torque request, the cylinder shut-off torque request, and/or the fuel mass torque request based on the immediate torque request.

The actuation module 224 may generate one or more of these requests based on the requestor. As an example, the actuation module 224 may generate one of these torque requests based on the requestor when a fuel cutoff control module 20 generates an immediate torque request for disabling the provision of fuel to the engine 102. The fuel cutoff control module 20 is discussed further below.

The spark torque request may be used by a spark control module 232 to determine how much to retard the spark timing (which reduces the engine output torque) from a calibrated spark advance. The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current APC. The fuel control module 240 may instruct the fuel actuator module 124 to inject this fuel mass for each activated cylinder.

Based on the fuel mass torque request, the fuel control module 240 may adjust the air/fuel ratio with respect to stoichiometry to increase or decrease engine output torque. The fuel control module 240 may then determine a fuel mass for each cylinder that achieves the desired air/fuel ratio. In diesel systems, fuel mass may be the primary actuator for controlling engine output torque. During fuel cutoff, the actuation module 224 may generate the fuel mass torque request such that the fuel control module 240 disables the provision of fuel to the engine 102.

A torque estimation module 244 may estimate torque output of the engine 102. This estimated torque may be used by the air control module 228 to perform closed-loop control of the engine airflow parameters, such as the throttle area, the MAF, the MAP, the APC, and the phaser positions. For example only, a torque relationship such as:

$$T=f(APC,S,I,E,AF,OT,\#) \qquad (1)$$

may be defined, where torque (T) is a function of mass of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine the APC based on the MAF and the RPM, thereby allowing closed-loop control of the engine airflow parameters control based on current engine airflow conditions. The intake and exhaust cam phaser positions used may be based on actual positions, as the phasers may be traveling toward desired positions.

The torque estimation module 244 may use the actual spark advance to estimate the engine output torque. When a calibrated spark advance value is used to estimate the engine output torque, the estimated torque may be called an estimated air torque, or simply air torque. The air torque is an estimate of how much torque the engine 102 could generate with the current airflow conditions if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed-loop control of the engine airflow actuators. For example, the desired area signal may be controlled to minimize a difference between the estimated air torque and the air torque request.

The air control module 228 may output a desired MAP signal to a boost scheduling module 248. The boost scheduling module 248 may use the desired MAP signal to control the boost actuator module 164. The boost actuator module 164 then controls one or more turbochargers (e.g., the turbocharger including the turbine 160-1 and the compressor 160-

2) and/or superchargers. The desired MAP may also be used by the throttle actuator module 116 in controlling the throttle valve 112.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des} = f^{-1}(T_{des}, APC, I, E, AF, OT, \#) \qquad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to a mean best torque (MBT) as possible. MBT refers to the maximum engine output torque that is achievable for a given engine airflow conditions as spark advance is increased, while using fuel having an octane rating greater than a predetermined octane rating and using stoichiometric fueling. The spark advance at which the MBT occurs is referred to as MBT spark timing. The calibrated spark advance may differ slightly from MBT spark timing because of, for example, fuel quality (such as when lower octane fuel is used) and environmental factors. The engine output torque produced using the calibrated spark advance may therefore be less than the MBT.

The fuel cutoff control module 20 selectively generates propulsion torque requests for fuel cutoff (FCO) events. For example only, the fuel cutoff control module 20 may generate propulsion torque requests to initiate and to control performance of clutch fuel cutoff (CFCO) events and deceleration fuel cutoff (DFCO) events. The fuel cutoff control module 20 may also generate propulsion torque requests for other types of FCO events.

The fuel cutoff control module 20 may generate a FCO predicted torque request and a FCO immediate torque request. When received, the propulsion torque arbitration module 206 may select the FCO torque requests from the fuel cutoff control module 20 as winning the arbitration. In this manner, the engine actuators are controlled based on the FCO torque requests during FCO events.

In some hybrid vehicles, the fuel cutoff control module 20 may receive a hybrid immediate torque request from the hybrid control module 196. The fuel cutoff control module 20 may generate the FCO immediate torque request based on the hybrid immediate torque request. In other hybrid vehicles, the hybrid control module 196 may provide the hybrid immediate torque request directly to the propulsion torque arbitration module 206. In such implementations, the propulsion torque arbitration module 206 may select the predicted torque request from the fuel cutoff control module 20 and the hybrid immediate torque request from the hybrid control module 196 as winning the arbitration. The engine actuators are then controlled based on these torque requests.

An engine capacities module 274 may determine one or more torque capacities of the engine 102. For example only, the engine capacities module 274 may determine a maximum off torque capacity and a minimum off torque capacity. The engine capacities module 274 may also determine one or more other engine torque capacities.

The maximum off torque capacity may correspond to a maximum engine output torque achievable with the provision of fuel disabled and the engine airflow actuators adjusted to minimize pumping losses during DFCO. In other words, controlling the engine airflow actuators based on the maximum off torque capacity may achieve a maximum reduction in pumping loss during DFCO.

The minimum off torque capacity may correspond to a minimum engine output torque achievable with the provision of fuel disabled and the engine actuators adjusted to maximize the pumping losses during DFCO. In other words, controlling the engine airflow actuators based on the minimum off torque capacity may provide zero reduction in the pumping losses sustained during DFCO. In some implementations, the minimum off torque capacity and the maximum off torque capacity may be provided to the hybrid control module 196.

The engine capacities module 274 may determine the maximum off torque capacity and the minimum off torque capacity based on the RPM, rubbing friction, and accessory loads applying a braking (i.e., negative) torque to the engine 102. The rubbing friction may be determined based on the oil temperature. The accessory loads may be imposed by, for example, the power steering pump, the air-conditioning (A/C) compressor, and/or other suitable loads.

The minimum off torque capacity may be determined further based on a minimum APC for combustion, and the maximum off torque capacity may be determined further based on a desired MAP or a desired APC. The fuel cutoff control module 20 may provide the desired MAP and/or the desired APC during DFCO. The fuel cutoff control module 20 may determine the desired MAP and the desired APC to achieve a pumping loss reduction during DFCO. In other words, the fuel cutoff control module 20 may determine the desired MAP and the desired APC to achieve a DFCO pumping loss reduction (DPLR).

The fuel cutoff control module 20 may provide a DPLR signal to the phaser scheduling module 252 when DPLR is to be performed. During DPLR, the phaser scheduling module 252 may control valve timing of the intake and exhaust valves 122 and 130 to minimize valve opening overlap. Valve opening overlap may describe a period during which both the intake valve 122 and the exhaust valve 130 are open. Intake and exhaust cam phaser angles to minimize valve opening overlap, and thereby minimize pumping losses, may be predetermined and may be selected based on the operating conditions. When the DPLR signal is not received, the phaser scheduling module 252 may adjust the timing of the intake and exhaust valves 122 and 130 based on the air torque request. For example only, during DFCO, the phaser scheduling module may eliminate valve opening overlap when the DPLR signal is not received.

Figure 3A:
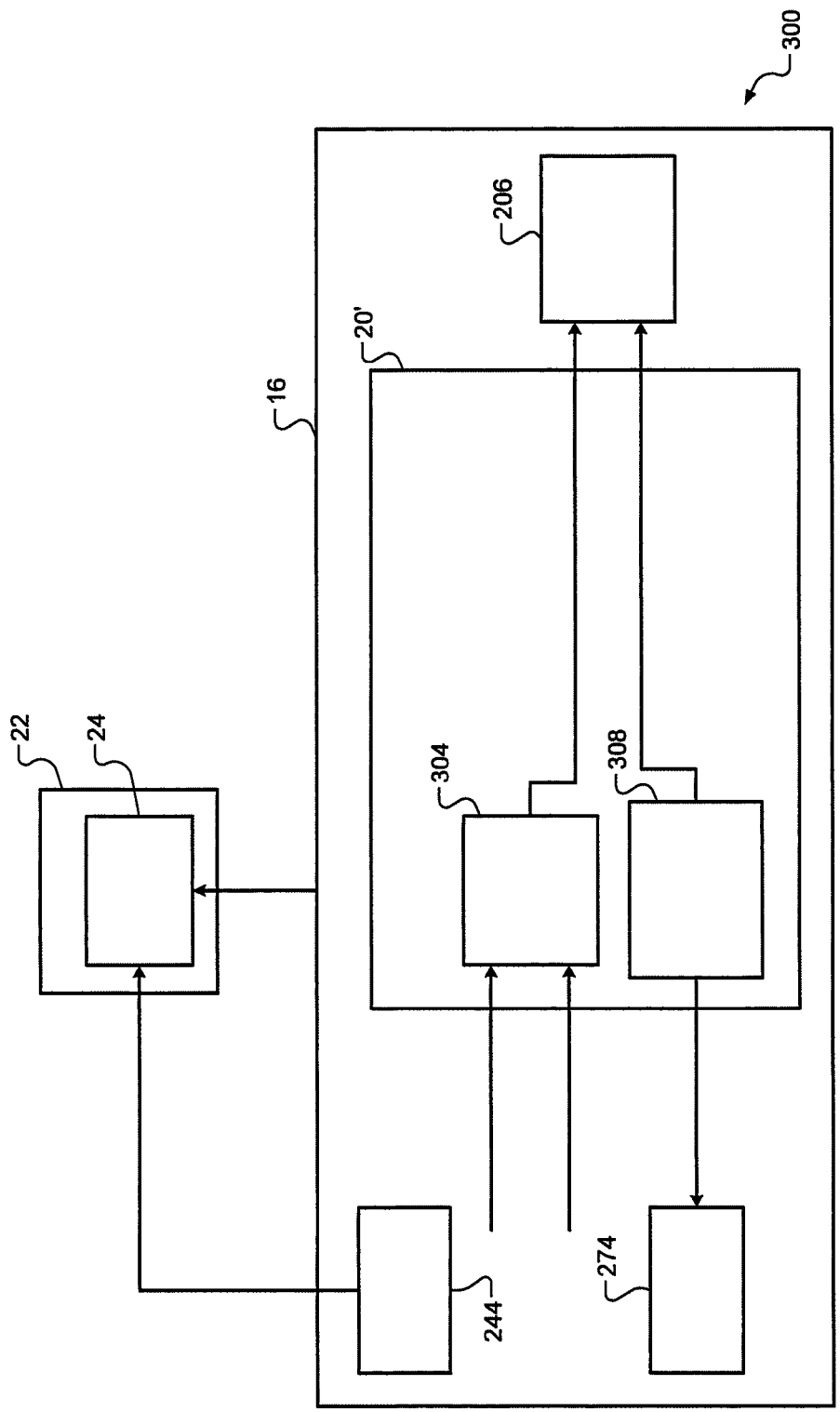
FIGS. 3A and 3B are functional block diagrams of deceleration fuel cutoff systems in accordance with the principles of the present disclosure.

Referring now to FIG. 3A, a functional block diagram of a DFCO system 300 is presented. The DFCO system 300 may be referred to as a driveline stiffness relaxation system and may be included, for example, in a non-hybrid vehicle. The DFCO system 300 includes the ECM 16 and the TCM 22. The ECM 16 may include a fuel cutoff control module 20' with a DFCO module 304 and a DPLR control module 308. The fuel cutoff control module 20' may replace the fuel cutoff control module 20 in FIGS. 1 and 2.

The DFCO module 304 may selectively initiate DFCO based on various operating parameters. The DFCO module 304 may selectively initiate DFCO based on, for example, the engine speed, and the driver torque request. The DFCO module 304 may selectively initiate DFCO based on one or more other suitable parameters.

For example only, in non-hybrid vehicles, the DFCO module 304 may initiate DFCO when the engine speed is greater than a predetermined speed, and the driver torque request is less than a predetermined torque. Written conversely, the DFCO module 304 may prevent the initiation of DFCO when the engine speed is less than the predetermined speed or when the driver torque request is greater than the predetermined torque.

The DFCO module 304 may generate a DFCO immediate torque request to initiate DFCO. The DFCO module 304 may also control the DFCO immediate torque request during DFCO. The DFCO module 304 may generate a DFCO signal and provide the DFCO signal to the DPLR control module 308 when the provision of fuel to the engine 102 (i.e., all of the cylinders) has been disabled.

The torque estimation module, the, the engine capacities module 274 and the DFCO module 304 may communicate with the slip control module 24 of the TCM 22. The torque estimation module 244 may transmit engine output torque signals ET to the slip control module 24. The engine capacities module 274 may transmit an actual torque signal to the slip control module 24 when fuel is disabled. The DFCO module 304 may transmit negative torque transition signals NTT and transition degree signals TR to the slip control module 24. The engine output torque signals ET indicate output torque estimates of the engine 102 including current and target engine output torques. The negative torque transition signals NTT indicate pending decreases and increases in engine output torque. The decreases and increases in engine output torque may include pending transitions into and out of negative torque events, such as transitions into and out of a DFCO event, air-conditioning clutch engaging and disengaging events, or other engine load or accessory load events. Other engine load and/or accessory load events may include the engagement or activation of an alternator, a generator, a cooling fan, etc. The other engine load and/or accessory load events may occur while DFCO is enabled. The transition degree signals TR indicate the amount of change in engine output torque and/or the rate at which engine output torque of the engine is to change during the transitions.

The slip control module 24 adjusts pressures within the TCC 15 (shown in FIG. 1) prior to and during the transitions into and out of the negative torque events to compensate for changing torque outputs of the engine 102. The slip control module 24 adjusts the pressures within the TCC 15 based on the engine output torque signals ET, the negative torque transition signals NTT and the transition degree signals TR.

The DPLR control module 308 may determine a desired DPLR MAP and a desired DPLR APC. The desired DPLR MAP may be provided to the engine capacities module 274, and the engine capacities module 274 may determine the maximum off torque capacity based on the desired DPLR MAP. When the provision of fuel to the engine 102 has been disabled, the DPLR control module 308 may determine a DPLR predicted torque request based on the desired DPLR APC.

Figure 3B:
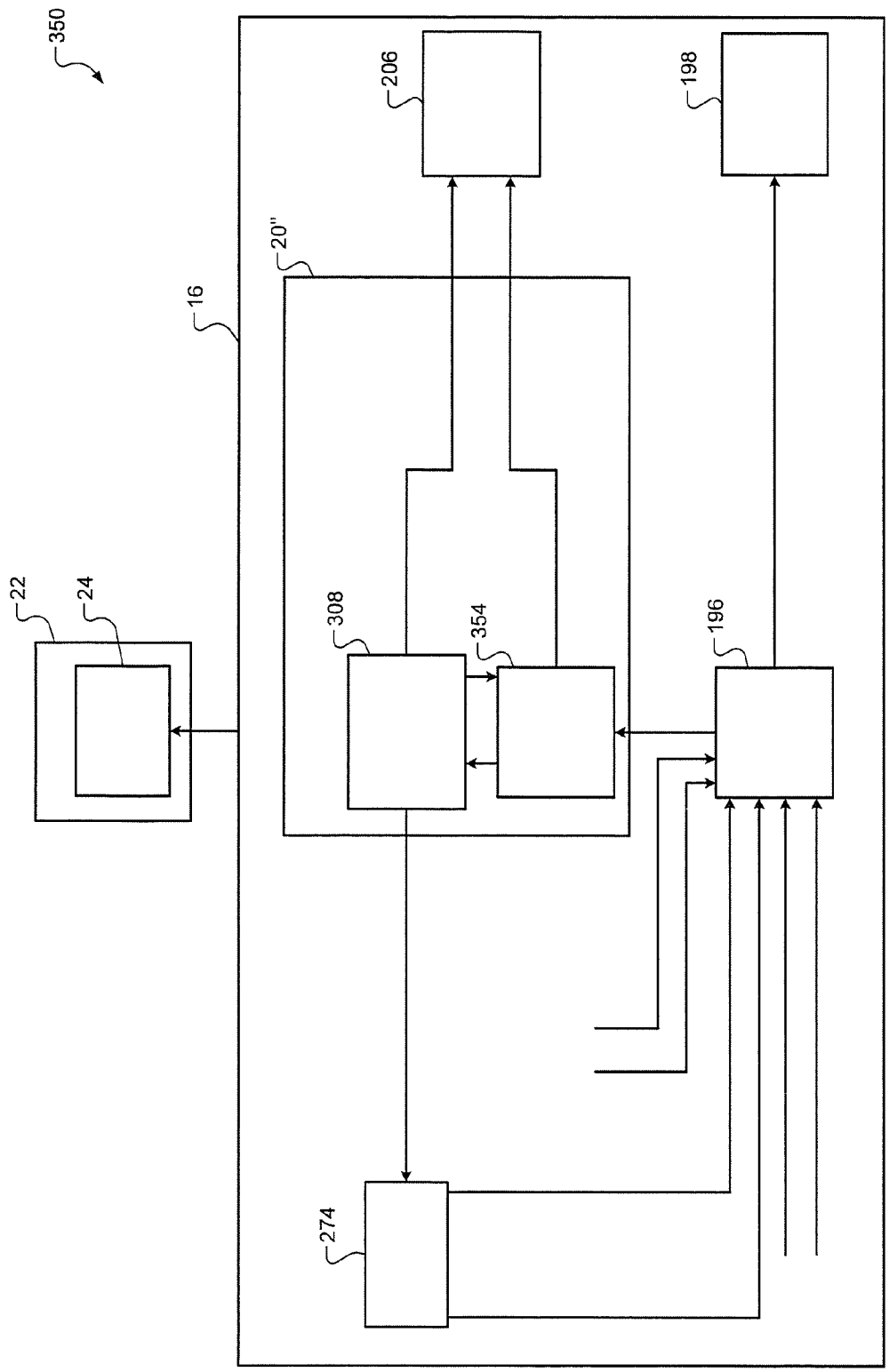

Referring now to FIG. 3B, a functional block diagram of another DFCO system 350 is presented. The DFCO system 350 may be referred to as a driveline stiffness relaxation system and may be included, for example, in a hybrid vehicle. The DFCO system 350 includes a fuel cutoff control module 20" with a DFCO module 354 and the DPLR control module 308. The fuel cutoff control module 20" may replace the fuel cutoff control module 20 in FIGS. 1 and 2.

The DFCO module 304 may communicate with the slip control module 24 of the TCM 22. The DFCO module 304 may transmit engine output torque signals ET, negative torque transition signals NTT and transition degree signals TR to the slip control module 24. The slip control module 24 may then adjust pressures with the TCC 15 prior to and during the transitions to compensate for the changes in engine output torque.

The hybrid control module 196 may receive the predicted and immediate torque requests and determine how much torque should be produced by the engine 102 and how much torque should be produced by the electric motor 198. In hybrid vehicles where the electric motor 198 is mechanically coupled to the crankshaft, for example, by a belt (e.g., a belt alternator starter), the hybrid control module 196 may determine how to achieve the predicted and immediate torque requests using the engine 102 and the electric motor 198. In hybrid vehicles where the electric motor 198 is mechanically linked to the transmission, the hybrid control module 196 may determine how to use the combination of gear ratio, the engine 102, and the electric motor 198 to achieve the predicted and immediate torque requests.

The hybrid control module 196 may control the electric motor 198 based on the torque that should be produced by the electric motor 198. In this manner, the hybrid control module 196 may optimize the operation of the engine 102 and the electric motor 198. The hybrid control module 196 may output modified predicted and/or immediate torque requests to the propulsion torque arbitration module 206.

The hybrid control module 196 may determine whether to initiate DFCO. For example only, the hybrid control module 196 may determine whether to initiate DFCO based on the engine speed, the driver torque request, state of charge of the energy storage device, and/or one or more other suitable parameters.

The hybrid control module 196 may initiate DFCO when, for example, the engine speed is greater than the predetermined speed, the driver torque request is less than the predetermined torque, and the state of charge is greater than the predetermined state of charge. Written conversely, the hybrid control module 196 may prevent the initiation of DFCO when the engine speed is less than the predetermined speed, when the driver torque request is greater than the predetermined torque, or when the state of charge is less than the predetermined state of charge. The hybrid control module 196 may generate the hybrid immediate torque request to initiate DFCO, and the hybrid control module 196 may control the generation of the hybrid immediate torque request during DFCO.

The DFCO module 354 may generate the DFCO immediate torque request based on the hybrid immediate torque request. The DFCO module 354 may also selectively modify the hybrid immediate torque request before providing the DFCO immediate torque request to propulsion torque arbitration module 206. The DFCO module 354 may selectively modify the hybrid immediate torque request, for example, to ensure that the provision of fuel to the engine 102 has been disabled or enabled in steady-state.

For example only, the DFCO module 354 may filter, buffer, shape, and/or apply another suitable hysterysis modification. The modification of the hybrid immediate torque request may be performed, for example, to remediate a delay present between the determination of the maximum and minimum off torque capacities and the provision of the resulting hybrid immediate torque request to the propulsion torque arbitration module 206. This delay may be attributable to the determination of the maximum and minimum off torque capacities and provision to the hybrid control module 196 during a first control loop, the determination of the hybrid immediate torque request and provision of the hybrid immediate torque request to the ECM 16 during a second control loop, and the provision of the hybrid immediate torque request to the propulsion torque arbitration module 206 during a third control loop.

Figure 4:
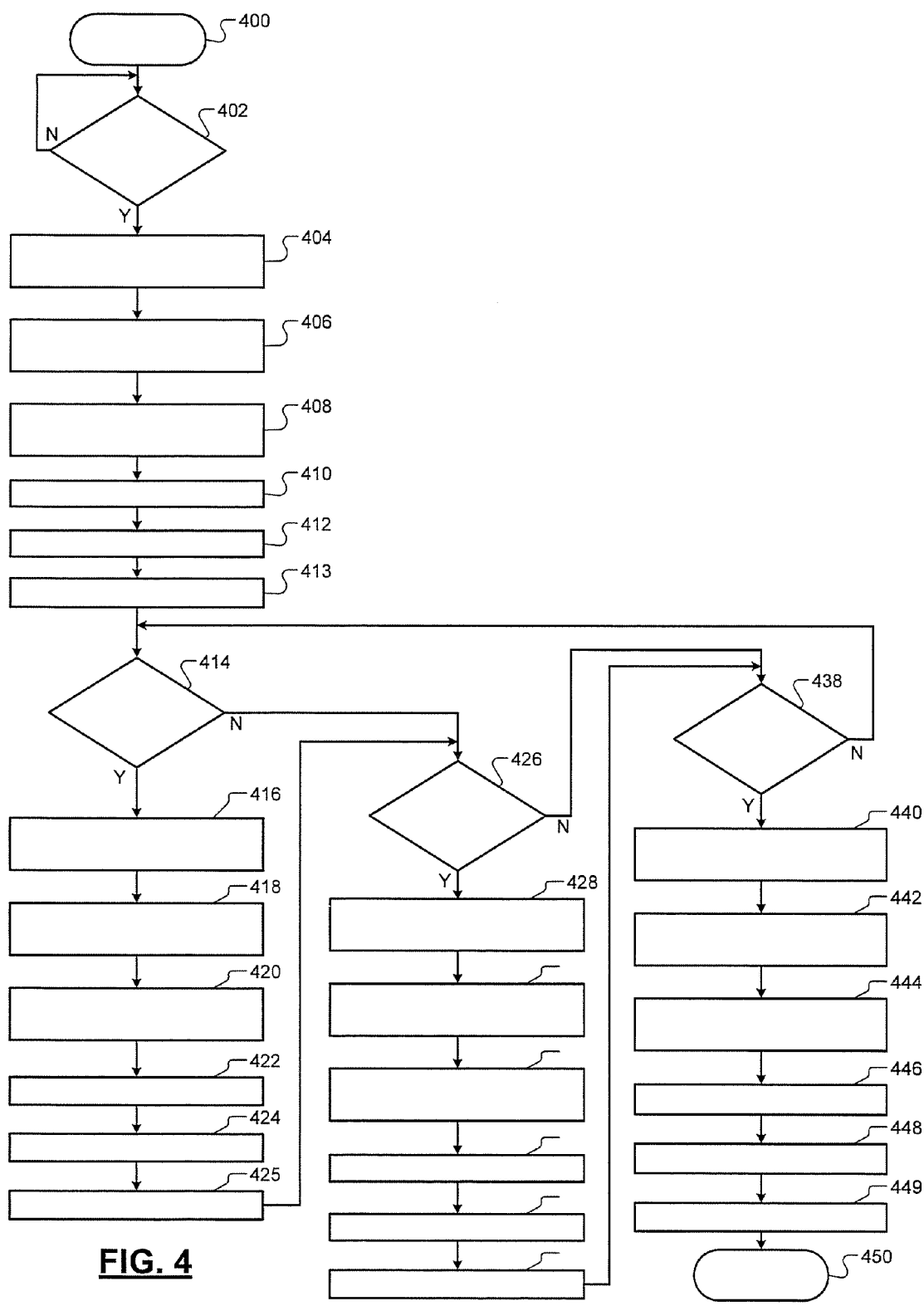
FIG. 4 illustrates a method of providing driveline stiffness relaxation during DFCO and in accordance with the present disclosure.

The powertrain system 10 of FIG. 1 and the DFCO systems of FIGS. 3A and 3B may be operated using numerous methods, an example method is provided in FIG. 4. In FIG. 4, a method of providing driveline stiffness relaxation during DFCO is shown. Driveline stiffness relaxation refers to the adjustment in pressures of the TCC 15 to prevent slip away events and crash events. Driveline stiffness relaxation includes providing slip to dampen large and quick increases and/or decreases in negative output torque of the engine 102 (i.e. torque changes greater than a predetermined magnitude and within a predetermined period of time). The pressures are adjusted such that jerks and/or sudden accelerations are minimized and/or dampened when transitioning to and from negative torque events.

Figure 5:
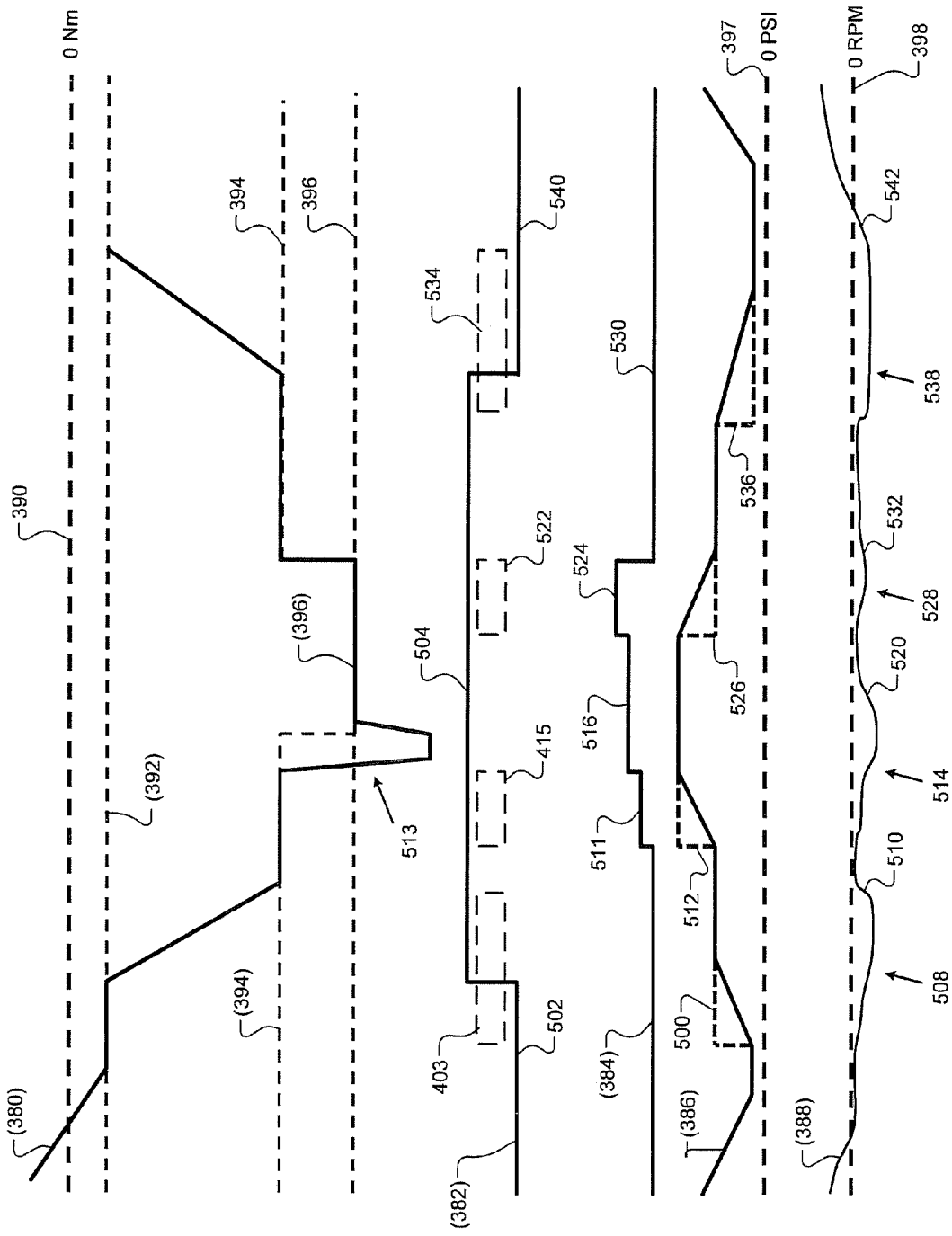
FIG. 5 is a signal flow diagram illustrating an implementation of the present disclosure.

Tasks of the method are further illustrated by the signal diagram of FIG. 5. The signal diagram includes an engine output torque signal $T_E$ (380), a DFCO enable signal DFCO (382), an air-conditioning clutch state signal AC (384), a TCC pressure signal $T_{CCPres}$ (386) and a TCC slip signal $T_{CCslip}$ (388).

Four engine torque levels are shown in relation to the engine output torque signal $T_E$. The four engine torque levels include 0 Nm (390), engine torque output for minimum air minimum spark $T_{MAMS}$ (392), engine torque output when combustion of the engine 102 is disabled $T_{MO}$ (394), and engine torque output when combustion is disabled and air-conditioning is enabled $T_{MO+AC}$ (396). Engine torque output for minimum air minimum spark $T_{MAMS}$ (392) may refer to operating the engine with minimum air and retarded spark to a minimum level (or lowest point) where proper combustion can be maintained without misfiring the engine. Note that this amount of torque may be negative, as shown. A TCC pressure level 397 of 0 pounds-per-square-inch (PSI) is shown. A TCC slip speed level 398 of 0 RPM is also shown.

Although the following tasks are primarily described with respect to the implementations of FIGS. 1-3, the tasks may be easily modified to apply to other implementations of the present disclosure. The tasks may be iteratively performed. The method may begin at 400.

At 402, the ECM 16, the fuel cutoff control module 20 and/or the DFCO module 304 (or 354, hereinafter the DFCO module) determines whether DFCO is to be enabled, as described above. Task 404 is performed when DFCO is to be enabled. Shaded block 403 indicates a period when a DFCO enable request and a torque decrease due to DFCO are pending.

At 404, the ECM 16 and/or the DFCO module estimates negative torque output of the engine (target torque) when DFCO is enabled and generates an engine torque output signal ET to indicate the estimated torque (expected torque signal). The negative torque output of the engine when DFCO is enabled (combustion is disabled) is referred to as a minimum off capacity torque and is identified as the torque level $T_{MO}$ in FIG. 5. The engine torque output signal ET is received by the slip control module 24.

At 406, the ECM 16 and/or the DFCO module generates a negative torque transition signal NTT to indicate that a decrease in engine output torque is to occur. The negative torque transition signal NTT may indicate a crankshaft torque stability level and a crankshaft torque stability level and is received by the slip control module 24. The crankshaft torque stability type may, for example, be an integer value corresponding to torque operating state, such as a normal stability state (type 0), a torque pulsation state (type 1), a torque decrease state (type 2), and a torque increase state (type 3). At 406, the crankshaft torque stability type may be set equal to 2 to indicate a decrease in torque is pending. The crankshaft torque stability type may remain at 2 until fuel is disabled to all cylinders of the engine 102 and/or the period of a pending torque decrease is over. The values of the crankshaft torque stability types disclosed herein are arbitrary and may be different.

The crankshaft torque stability level may be an integer value corresponding to a change in torque range and/or a torque rate. The levels may be grouped and associated with certain negative torque events. For example, levels 1-3 may be associated with enabling and disabling DFCO. As another example, levels 4-7 may be associated with activating and deactivating air-conditioning. As yet another example, level 4 may be associated with a change in torque of 2-6 Nm, level 5 may be associated with a change in torque of 6-10 Nm, level 6 may be associated with a change in torque of 11-15 Nm and level 7 may be associated with a change in torque equal to or greater than 16 Nm. The values of the crankshaft torque stability levels disclosed herein are arbitrary and may be different.

A level may not be provided for changes in torque of less than a predetermined amount. For example, a level may not be provided for a change in torque of less than 2 Nm, as this may not be felt by a vehicle operator should the driveline stiffness relaxation described herein not be performed.

At 408, the ECM 16 and/or the DFCO module may generate a transition degree signal TR to indicate an amount of change in engine output torque and/or rate at which the engine output torque is to change during a transition from a DFCO disabled state to DFCO enabled state. The transition degree signal is received by the slip control module 24. Task 408 may not be performed. The amount of change and the rate of change in engine output torque may be estimated by the slip control module 24 and based on the engine output torque signal ET and the crankshaft torque stability type and level.

At 410, the slip control module 24 prior to and/or while transitioning to the DFCO enabled state adjusts pressure of the TCC 15. The slip control module 24 adjusts (increases) the pressure of the TCC 15 based on the engine torque output signal ET, the negative torque transition signal NTT, and the transition rate signal TR. An example increase is shown at 500 in FIG. 5.

The TCM 22 and/or the slip control module 24 adjusts the pressure of the TCC 15 to handle the minimum off capacity torque, which is the engine torque produced when combustion of the engine 102 is disabled. If the TCC 15 is in a locked state pressure is adjusted to provide slip during the transition. Although the slip control module 24 is allowing the TCC 15 to slip during the transition, the pressure within the TCC may increase during the transition to compensate for the absolute value increase in engine output torque. This increase in slip is shown at area 508 of the TCC slip signal $T_{CCslip}$ in FIG. 5. The slip control module 24 controls the amount of slip to be within a predetermined range. The predetermined range is determined as a function of the expected engine output torque. This increase in pressure along with controlled slip dampens the transition.

If the TCC 15 is not being operated in a locked state, the amount of controlled slip may be adjusted and/or increased during the transition. The locked state may refer to when input and output speed of the TCC 15 are the same or crankshaft speed of the engine 102 is equal to turbine speed of the TCC 15. As an example, the amount of slip may increase from being between 15-30 RPM to 30-50 RPM.

At 412, the DFCO module enables DFCO. State of the DFCO enable signal DFCO changes from a first state (e.g., LOW) to a second state (e.g., HIGH). The LOW state is designated 502. The HIGH state is designated 504.

At 413, the slip control module 24 reduces the amount of slip of the TCC 15 based on completion of a transition to the negative torque (DFCO) event. The amount of slip may be reduced to a previous amount of slip provided before the transition and/or back to a locked state. This reduction in slip is shown at 510 of the TCC slip signal $T_{CCslip}$. The slip control module 24 may maintain the pressure in the TCC 15 subsequent to the enabling of the DFCO event and return from open loop control to closed loop control of slip speed to adjust the pressure in the TCC 15 to a selected slip speed.

At 414, the ECM 16 determines whether a device or accessory (load introducing device or load reducing device) is about to provide a load to the engine 102 while DFCO is enabled. Although the following tasks are described with respect to an air-conditioning compressor and clutch, the tasks may be applied to other load introducing and/or load reducing devices. This may occur, for example, when an air-conditioning compressor is to be activated. Task 416 is performed when a load is to be provided and/or the load introducing device is to be engaged or activated, otherwise task 426 is performed. Shaded block 415 indicates a period when a load enable request and a torque decrease due to the load are pending. Also, section 511 of the A/C clutch state signal AC indicates that air-conditioning engagement is pending. The A/C clutch state signal AC may increase to indicate the pending engagement of the air-conditioning clutch.

At 416, the ECM 16 estimates negative torque output of the engine (target torque) when air-conditioning is enabled $T_{MO+AC}$ and generates the engine torque output signal ET to indicate the estimated torque (expected torque signal). The engine output torque decreases sharply for a period of time prior to the engine output torque stabilizing at the $T_{MO+AC}$ level. This is due to inertia of the air-conditioning compressor, designated by area 513. The engine torque output signal ET is received by the slip control module 24.

At 418, the ECM 16 generates a negative torque transition signal NTT to indicate that a decrease in engine output torque is to occur. The negative torque transition signal NIT may indicate one of the crankshaft torque stability types and one of the crankshaft torque stability levels associated with enabling the load introducing device and is received by the slip control module 24. The crankshaft torque stability type may be 2 and the crankshaft torque stability level may be a level between, for example, 4 and 7. The crankshaft torque stability type is equal to 2 until the air-conditioning clutch is engaged and/or the period for a pending decrease in output torque is over.

At 420, the ECM 16 may generate a transition degree signal TR to indicate an amount of change in engine output torque and/or rate at which the engine output torque is to change during a transition from a load disabled state to a load enabled state. The amount of change (or Δ) is equal to the difference between the minimum off capacity torque and the total negative output torque when the load of the air-conditioning compressor is introduced. The transition degree signal is received by the slip control module 24. Task 420 may not be performed. The amount of change and the rate of change in engine output torque may be estimated by the slip control module 24 and based on the engine output torque signal ET and the crankshaft torque stability type and level.

At 422, the slip control module 24 prior to and/or while transitioning to the load enabled state adjusts pressure of the TCC 15. The slip control module 24 adjusts (increases) the pressure of the TCC 15 based on the engine torque output signal ET, the negative torque transition signal NTT, and the transition degree signal TR. This increase in pressure is designated 512 in FIG. 5.

The TCM 22 and/or the slip control module 24 adjusts the pressure of the TCC 15 to handle the negative torque output of the engine due to the load of the air-conditioning compressor in addition to the minimum off capacity torque. If the TCC 15 is in a locked state pressure is adjusted to provide slip during the transition. Although the slip control module 24 is allowing the TCC 15 to slip during the transition, the pressure within the TCC may increase during the transition to compensate for the absolute value of the increased amount of engine output torque (i.e. the absolute value of the negative output torque). This increase in slip is shown in the area designated 514 of FIG. 5. The slip control module 24 controls the amount of slip to be within a predetermined range. The predetermined range is determined as a function of the expected engine output torque. This increase in pressure along with controlled slip dampens the transition. If the TCC 15 is not being operated in a locked state, the amount of controlled slip may be adjusted and/or increased during the transition.

At 424, the ECM 16 enables air-conditioning (e.g., engages air-conditioning clutch). Section 516 of the air-conditioning clutch state signal AC indicates that the air-conditioning clutch is engaged. The air-conditioning clutch state signal AC may increase in value to indicate the engagement.

At 425, the slip control module 24 reduces the amount of slip of the TCC 15 based on completion of a transition to the negative torque (load introducing) event. This may include adjusting the pressure within the TCC 15 and/or maintaining a constant pressure within the TCC 15, as shown. The amount of slip may be reduced to a previous amount of slip provided before the transition and/or back to a locked state. The reduction in slip is designated 520. The slip control module 24 may maintain the pressure in the TCC 15 subsequent to the enabling of air-conditioning and/or the negative torque event and return from open loop control to closed loop control of slip speed to adjust the pressure in the TCC 15 to a selected slip speed.

At task 426, the ECM 16 determines whether the load introducing device is to be disengaged and/or deactivated while DFCO is enabled. Task 428 is performed when the load introducing device is to be deactivated, otherwise task 438 is performed. Shaded block 522 indicates a period when a torque increase is pending. Section 524 of the air-conditioning clutch state signal AC indicates that a disengagement of the air-condition clutch is pending. The A/C clutch state signal AC may increase to indicate the pending disengagement of the air-conditioning clutch.

At 428, the ECM 16 estimates negative torque output of the engine (target torque) when air-conditioning is disabled $T_{MO}$ and generates the engine torque output signal ET to indicate the estimated torque (expected torque signal). The engine torque output signal ET is received by the slip control module 24.

At 430, the ECM 16 generates a negative torque transition signal NTT to indicate that an increase in engine output torque is to occur. The negative torque transition signal NTT may indicate one of the crankshaft torque stability types and one of the crankshaft torque stability levels associated with disabling the load-introducing device and is received by the slip control module 24. The crankshaft torque stability type may be 3 and the crankshaft torque stability level may be a level between 4 and 7. The crankshaft torque stability type is equal to 3 until the air-conditioning clutch is disengaged and/or the period for a pending increase in output torque is over.

At 432, the ECM 16 may generate a transition degree signal TR to indicate an amount of change in engine output torque and/or rate at which the engine output torque is to change during a transition from the load enabled state to the load disabled state (load reducing event). The transition degree signal TR is received by the slip control module 24. Task 432 may not be performed. The amount of change and the rate of change in engine output torque may be estimated by the slip control module 24 and based on the engine output torque signal ET and the crankshaft torque stability type and level. The amount of change (or $\Delta$) is equal to the difference between the total negative output torque with the load of the air-conditioning compressor and the minimum off capacity torque.

At 434, the slip control module 24 prior to and/or while transitioning to the load disabled state adjusts pressure of the TCC 15. The slip control module 24 adjusts (decreases) the pressure of the TCC 15 based on the engine torque output signal ET, the negative torque transition signal NTT, and the transition degree signal TR. This decrease in pressure is designated 526 in FIG. 5.

The TCM 22 and/or the slip control module 24 adjusts the pressure of the TCC 15 to handle the minimum off capacity torque. If the TCC 15 is in a locked state pressure is adjusted to provide slip during the transition. Although the slip control module 24 is allowing the TCC 15 to slip during the transition, the pressure within the TCC may decrease during the transition to compensate for the absolute value decrease in engine output torque. This increase in slip is shown in the area designated 528 of FIG. 5. The slip control module 24 controls the amount of slip to be within a predetermined range. The predetermined range is determined as a function of the expected engine output torque. This decrease in pressure along with controlled slip dampens the transition. If the TCC 15 is not being operated in a locked state, the amount of controlled slip may be adjusted and/or increased during the transition.

At 436, the ECM 16 disables air-conditioning (disengages the air-conditioning clutch). State of the air-conditioning clutch state signal decreases to a LOW state, designated 530.

At 437, the slip control module 24 reduces the amount of slip of the TCC 15 based on completion of a transition from the negative torque (load introducing) event. This may include adjusting the pressure within the TCC 15 and/or maintaining a constant pressure within the TCC 15, as shown. The amount of slip may be reduced to a previous amount of slip provided before the transition and/or back to a locked state. The reduction in slip is designated 532. The slip control module may maintain the pressure in the TCC 15 subsequent to the disabling of the air-conditioning and/or negative torque event and return from open loop control to closed loop control of slip speed to adjust the pressure in the TCC 15 to a selected slip speed.

At task 438, the ECM 16 determines whether DFCO is to be disabled. Task 440 is performed when DFCO is to be disabled, otherwise the ECM returns to task 414 is performed. Shaded block 534 indicates a period when a torque increase is pending.

At 440, the ECM 16 estimates negative torque output of the engine (target torque) when DFCO is disabled and generates the engine torque output signal ET to indicate the estimated torque (expected torque signal). As an example, the estimated engine output torque when DFCO is disabled may be equal to the torque output with minimum air and minimum spark $T_{MAMS}$. The engine torque output signal ET is received by the slip control module 24.

At 442, the ECM 16 generates a negative torque transition signal NTT to indicate that an increase in engine output torque is to occur. The negative torque transition signal NTT may indicate one of the crankshaft torque stability types and one of the crankshaft torque stability levels associated with disabling the load-introducing device and is received by the slip control module 24. The crankshaft torque stability type may be 3 and the crankshaft torque stability level may be a level between 1 and 3. The crankshaft torque stability type is equal to 3 until DFCO is disabled (fuel to all cylinders is enabled) and/or the period for a pending increase in output torque is over.

At 444, the ECM 16 may generate a transition degree signal TR to indicate an amount of change in engine output torque and/or rate at which the engine output torque is to change during a transition from the DFCO enabled state to the DFCO disabled state. The transition degree signal TR is received by the slip control module 24. Task 444 may not be performed. The amount of change and the rate of change in engine output torque may be estimated by the slip control module 24 and based on the engine output torque signal ET and the crankshaft torque stability type and level.

At 446, the slip control module 24 prior to and/or while transitioning to the DFCO disabled state adjusts pressure of the TCC 15. The slip control module 24 adjusts (decreases) the pressure of the TCC 15 based on the engine torque output signal ET, the negative torque transition signal NTT, and the transition degree signal TR. This decrease in pressure is designated 536 in FIG. 5. The pressure is decreased to a level to provide slip and prevent a TCC crash when engine combustion is enabled.

The TCM 22 and/or the slip control module 24 adjusts the pressure of the TCC 15 to handle the engine output torque when DFCO is disabled. If the TCC 15 is in a locked state pressure is adjusted to provide slip during the transition. Although the slip control module 24 is allowing the TCC 15 to slip during the transition, the pressure within the TCC may decrease during the transition to compensate for the absolute value decrease in engine output torque. This increase in slip is shown in the area designated 538 of FIG. 5. The slip control module 24 controls the amount of slip to be within a predetermined range. The predetermined range is determined as a function of the expected engine output torque. This decrease in pressure along with controlled slip dampens the transition. If the TCC 15 is not being operated in a locked state, the amount of controlled slip may be adjusted and/or increased during the transition.

At 448, the ECM 16 disables DFCO (enables fuel). State of the DFCO enable signal DFCO decreases to the LOW state, designated 540.

At 449, the slip control module 24 reduces the amount of slip of the TCC 15 based on completion of a transition from the negative torque (DFCO) event. This may include adjusting the pressure within the TCC 15 and/or maintaining a constant pressure within the TCC 15, as shown. The amount of slip may be reduced to a previous amount of slip provided before the transition and/or back to a locked state. The slip control module may maintain the pressure in the TCC 15 subsequent to the disabling of the DFCO event and return from open loop control to closed loop control of slip speed to adjust the pressure in the TCC 15 to a selected slip speed. The reduction in slip is designated 542. The method may be iteratively performed and return to task 402 or may end at 450, as shown.

The above-described tasks are meant to be illustrative examples; the tasks may be performed sequentially, synchronously, simultaneously, continuously, during overlapping time periods or in a different order depending upon the application.

Multiple negative torque events may occur during the same period of time. The negative torque events may be prioritized. Negative torque events with, for example, higher crankshaft torque stability levels (i.e. events with larger changes in torque) may be given a higher priority level. Negative torque events with a higher priority level may be addressed before negative torque events with a lower priority level. The negative torque events should be addressed to prevent engine speed sags and/or a stall of the engine (engine speed reduced to 0).

As an example, a torque decrease pending may be prioritized over other negative torque events because of the possibility of engine speed sags or stall should the TCM 22 not prepare adequate clutch pressure. As another example, if air-conditioning clutch engagement is pending when fuel is ramping OFF for enabling a DFCO event, the ECM 16 transmits a crankshaft torque stability type and a crankshaft torque stability level for air-conditioning clutch engagement. As an alternative, the crankshaft torque stability type and a crankshaft torque stability level may be set to compensate for multiple negative torque events. The crankshaft torque stability type indicates a torque decrease pending and the crankshaft torque stability level is between 4 and 7 (based on expected torque decrease). This allows the TCM 22 to prepare for the larger magnitude of negative torque and/or a combination of the negative torque associated with enabling the DFCO event and the air-conditioning clutch engagement.

The above disclosed implementations allow quick DFCO transitions, as pressures within a TCC are adjusted to support large and quick transitions in negative output torque of an engine. This extends DFCO range and improves fuel economy. The dampening provided herein improves drivability during negative torque event transitions. This dampening allows the use of fixed displacement air-conditioning compressors without slip away and/or crash events.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A powertrain system comprising:
an engine control module that generates a negative torque transition signal based on a pending negative torque event of an engine; and
a transmission control module that receives the negative torque transition signal from the engine control module, wherein the transmission control module
increases a slip speed of a torque converter clutch in preparation for the pending negative torque event by adjusting pressure in the torque converter clutch prior to the pending negative torque event, and
decreases the slip speed in the torque converter clutch based on completion of a transition at least one of to the pending negative torque event and from the pending negative torque event,
wherein the transmission control module adjusts pressure in the torque converter clutch to prevent a slip away event during the pending negative torque event, wherein the slip away event occurs when the slip speed in the torque converter clutch exceeds a predetermined slip speed.

2. The powertrain system of claim 1, wherein:
the engine control module comprises a fuel cutoff module that generates the negative torque transition signal when the pending negative torque event is a deceleration fuel cutoff event;
the transmission control module increases the pressure in the torque converter clutch prior to and in preparation for enabling the deceleration fuel cutoff event; and
the transmission control module maintaining the pressure in the torque converter clutch subsequent to the enabling of the deceleration fuel cutoff event.

3. The powertrain system of claim 1, wherein:
the engine control module comprises a fuel cutoff module that generates the negative torque transition signal when the pending negative torque event is a deceleration fuel cutoff event;
the transmission control module decreases the pressure in the torque converter clutch prior to and in preparation for disabling the deceleration fuel cutoff event; and
the transmission control module maintains the pressure in the torque converter clutch subsequent to the disabling of the deceleration fuel cutoff event and returns from open loop control to closed loop control of slip speed to adjust the pressure in the torque converter clutch to a selected slip speed.

4. The powertrain system of claim 1, wherein:
the engine control module generates the negative torque transition signal during a deceleration fuel cutoff event and when the pending negative torque event is a load introducing event, wherein the load introducing event includes providing a load on the engine;
the transmission control module increases the pressure in the torque converter clutch prior to and in preparation of the load introducing event; and
the transmission control module maintains the pressure in the torque converter clutch subsequent to the load introducing event.

5. The powertrain system of claim 4, wherein the load introducing event includes engaging an air-conditioning clutch.

6. The powertrain system of claim 1, wherein:
the engine control module generates the negative torque transition signal during a deceleration fuel cutoff event and when the pending negative torque event is a load removing event, wherein the load removing event includes removing a load on the engine;
the transmission control module decreases the pressure in the torque converter clutch prior to and in preparation for the load removing event; and
the transmission control module maintains the pressure in the torque converter clutch subsequent to the load removing event.

7. The powertrain system of claim 1, wherein the pending negative torque event includes at least one of a deceleration fuel cutoff event and a load introducing event, and wherein the load introducing event includes providing a load on the engine during the deceleration fuel cutoff event.

8. The powertrain system of claim 1, wherein the transmission control module increases the pressure in the torque converter clutch when the pending negative torque event is to cause a decrease in output torque of the engine from a negative torque, and wherein the transmission control module increases the pressure to prevent a slip away event while decreasing the output torque of the engine.

9. The powertrain system of claim 1, wherein:
the engine control module generates an engine torque output signal that indicates output torque of the engine during the pending negative torque event; and the transmission control module adjusts the pressure in the torque converter based on the output torque of the engine and prior to the pending negative torque event.

10. The powertrain system of claim 1, wherein:
the negative torque transition signal comprises a crankshaft torque stability type and a crankshaft torque stability level;
the crankshaft torque stability type indicates whether output torque of the engine increases or decreases when transitioning at least one of to the pending negative torque event and from the pending negative torque event;
the crankshaft torque stability level indicates at least one of
  a range in the output torque of the engine during the pending negative torque event, and
  a rate of change in the output torque of the engine when transitioning at least one of to the pending negative torque event and from the pending negative torque event; and
the transmission control module adjusts the pressure in the torque converter based on the crankshaft torque stability type and the crankshaft torque stability level.

11. The powertrain system of claim 1, wherein:
the engine control module generates a transition degree signal that indicates at least one of
  an amount of change in an output torque of the engine when transitioning at least one of to the pending negative torque event and from the pending negative torque event, and
  a rate of change in the output torque of the engine when transitioning at least one of to the pending negative torque event and from the pending negative torque event; and
the transmission control module adjusts the pressure in the torque converter based on the transition degree signal and prior to the pending negative torque event.

12. A powertrain system comprising:
an engine control module that generates a negative torque transition signal based on a pending negative torque event of an engine; and
a transmission control module that receives the negative torque transition signal from the engine control module, wherein the transmission control module
  increases a slip speed of a torque converter clutch in preparation for the pending negative torque event by adjusting pressure in the torque converter clutch prior to the pending negative torque event, and
  decreases the slip speed in the torque converter clutch based on completion of a transition at least one of to the pending negative torque event and from the pending negative torque event,
wherein the transmission control module decreases the pressure in the torque converter clutch when the pending negative torque event is to cause an increase in output torque of the engine, wherein the transmission control module decreases the pressure to prevent a crash event while increasing the output torque of the engine, and wherein the crash event occurs when speed of the engine is reduced to a predetermined speed.

13. A method of operating a powertrain system comprising:
generating a negative torque transition signal based on a pending negative torque event of an engine via an engine control module;
receiving the negative torque transition signal from the engine control module via a transmission control module;
increasing a slip speed of a torque converter clutch in preparation for enabling of the pending negative torque event, wherein the increasing of the slip speed includes adjusting pressure in the torque converter clutch prior to the pending negative torque event;
decreasing the slip speed in the torque converter clutch based on completion of a transition at least one of to the pending negative torque event and from the pending negative torque event; and
generating the negative torque transition signal during a deceleration fuel cutoff event and when the pending negative torque event is a load removing event, wherein the load removing event includes providing a load on the engine by engaging an air-conditioning clutch.

14. The method of claim 13, further comprising:
increasing the pressure in the torque converter clutch prior to and in preparation for the deceleration fuel cutoff event; and
maintaining the pressure in the torque converter clutch subsequent to the deceleration fuel cutoff event.

15. The method of claim 13, further comprising:
decreasing the pressure in the torque converter clutch prior to and in preparation for disabling the deceleration fuel cutoff disable; and
maintaining the pressure in the torque converter clutch subsequent to the disabling of the deceleration fuel cutoff event and returns to closed loop control of slip speed to adjust the pressure in the torque converter clutch to a selected slip speed.

16. The method of claim 13, further comprising:
increasing the pressure in the torque converter clutch prior to and in preparation of the load removing event; and
maintaining the pressure in the torque converter clutch subsequent to the load removing event.

17. The method of claim 13, further comprising:
decreasing the pressure in the torque converter clutch prior to and in preparation for the load introducing event; and
maintaining the pressure in the torque converter clutch subsequent to the load introducing event.

18. The method of claim 13, further comprising:
adjusting the pressure in the torque converter clutch to prevent a slip away event during the pending negative torque event, wherein the slip away event occurs when the slip speed in the torque converter clutch exceeds a predetermined slip speed;
preventing a slip away event when transitioning to the pending negative torque event and while decreasing an output torque of the engine by increasing the pressure in the torque converter clutch prior to the pending negative torque event; and
prevent a crash event when transitioning from the pending negative torque event and while increasing the output torque of the engine by decreasing the pressure in the torque converter clutch prior to the pending negative torque event, wherein the crash event occurs when speed of the engine is reduced to a predetermined speed.

19. The method of claim 13, further comprising:
generating an engine torque output signal that indicates output torque of the engine during the pending negative torque event,
wherein
  the negative torque transition signal comprises a crankshaft torque stability type and a crankshaft torque stability level,
  the crankshaft torque stability type indicates whether the output torque of the engine increases or decreases when transitioning at least one of to the pending negative torque event and from the pending negative torque event, and the crankshaft torque stability level indicates at least one of
- a range in the output torque of the engine during the pending negative torque event, and
- a rate of change in the output torque of the engine when transitioning at least one of to the pending negative torque event and from the pending negative torque event;

generating a transition degree signal that indicates at least one of
- an amount of change in the output torque of the engine when transitioning at least one of to the pending negative torque event and from the pending negative torque event, and
- the rate of change in the output torque of the engine when transitioning at least one of to the pending negative torque event and from the pending negative torque event; and adjusting, via the transmission control module, the pressure in the torque converter prior to the pending negative torque event and based on the output torque of the engine, the crankshaft torque stability type, the crankshaft torque stability level and the transition degree signal.

* * * * *